US012038137B2

(12) United States Patent
Deletre et al.

(10) Patent No.: US 12,038,137 B2
(45) Date of Patent: Jul. 16, 2024

(54) SEALED AND THERMALLY INSULATING TANK COMPRISING ANTI-CONVECTIVE FILLING ELEMENTS

(71) Applicant: GAZTRANSPORT ET TECHNIGAZ, Saint Remy les Chevreuse (FR)

(72) Inventors: Bruno Deletre, Saint Remy les Chevreuse (FR); Marguerite D'Olce, Saint Remy les Chevreuse (FR); Olivier Perrot, Saint Remy les Chevreuse (FR)

(73) Assignee: GAZTRANSPORT ET TECHNIGAZ, Saint Remy les Chevreuse (FR)

( * ) Notice: Subject to any disclaimer, the term of this patent is extended or adjusted under 35 U.S.C. 154(b) by 79 days.

(21) Appl. No.: 17/997,601

(22) PCT Filed: Apr. 27, 2021

(86) PCT No.: PCT/EP2021/061023
§ 371 (c)(1),
(2) Date: Oct. 31, 2022

(87) PCT Pub. No.: WO2021/224071
PCT Pub. Date: Nov. 11, 2021

(65) Prior Publication Data

US 2023/0184383 A1 Jun. 15, 2023

(30) Foreign Application Priority Data

May 5, 2020 (FR) ....................................... 2004425

(51) Int. Cl.
*F17C 3/04* (2006.01)
*B63B 25/16* (2006.01)
(Continued)

(52) U.S. Cl.
CPC ................ *F17C 3/04* (2013.01); *B63B 25/16* (2013.01); *F17C 3/025* (2013.01); *F17C 3/027* (2013.01);
(Continued)

(58) Field of Classification Search
CPC .. F17C 3/04; F17C 3/025; F17C 3/027; F17C 13/001; F17C 13/026; F17C 2201/0157;
(Continued)

(56) References Cited

U.S. PATENT DOCUMENTS 3,319,431 A * 5/1967 Clarke .................... F17C 3/025 62/53.2
3,583,592 A * 6/1971 Kerfman ................. F17C 3/022 220/560.12
(Continued)

FOREIGN PATENT DOCUMENTS

WO WO-2014125186 A1 * 8/2014 ............. B63B 25/16
WO 2019043347 A1 3/2019
WO 2019102163 A1 5/2019

OTHER PUBLICATIONS

Machine translation of WO 2019102163, published May 31, 2019.
International Search Report, dated Jul. 9, 2021, for Application No. PCT/EP2021/061023.

*Primary Examiner* — Nicolas A Arnett
(74) *Attorney, Agent, or Firm* — SALIWANCHIK, LLOYD & EISENSCHENK

(57) ABSTRACT

The invention relates to a tank (71) for storing a liquefied gas, wherein the tank (71) includes peripheral walls (1), the peripheral walls (1) including a sealing membrane and at least one thermal insulation barrier,
wherein the sealing membrane includes corrugated metal plates comprising a first series of parallel corrugations, extending along a direction x and a second series of parallel corrugations extending along a direction y, the
(Continued)

direction x being a direction of greater slope, wherein the peripheral walls (1) comprise filling elements with pressure loss, which are disposed in the corrugations of the first series of corrugations so as to form a belt (16) of filling elements extending all round the tank (71), the belt being formed of at least one obstruction part (17) and of at least one discontinuation part (18), the belt including at most one discontinuation part (18) per peripheral wall (1).

19 Claims, 7 Drawing Sheets

(51) Int. Cl.
*F17C 3/02* (2006.01)
*F17C 13/00* (2006.01)
*F17C 13/02* (2006.01)

(52) U.S. Cl.
CPC .......... *F17C 13/001* (2013.01); *F17C 13/026* (2013.01); *F17C 2201/0157* (2013.01); *F17C 2201/052* (2013.01); *F17C 2203/0329* (2013.01); *F17C 2203/0358* (2013.01); *F17C 2203/0621* (2013.01); *F17C 2203/066* (2013.01); *F17C 2205/0355* (2013.01); *F17C 2221/033* (2013.01); *F17C 2221/035* (2013.01); *F17C 2223/0153* (2013.01); *F17C 2223/0161* (2013.01); *F17C 2223/033* (2013.01); *F17C 2227/0135* (2013.01); *F17C 2250/0439* (2013.01); *F17C 2260/033* (2013.01); *F17C 2270/0105* (2013.01); *F17C 2270/0107* (2013.01)

(58) Field of Classification Search
CPC ........ F17C 2201/052; F17C 2203/0329; F17C 2203/0358; F17C 2203/0621; F17C 2203/066; F17C 2205/0355; F17C 2221/033; F17C 2221/035; F17C 2223/0153; F17C 2223/0161; F17C 2223/033; F17C 2227/0135; F17C 2250/0439; F17C 2260/033; F17C 2270/0105; F17C 2270/0107; B63B 25/16
See application file for complete search history.

(56) References Cited

U.S. PATENT DOCUMENTS

| | | | | |
|---|---|---|---|---|
| 3,931,424 | A * | 1/1976 | Helf | B29C 66/72343 220/62.19 |
| 4,050,608 | A * | 9/1977 | Smith | F17C 13/001 52/309.1 |
| 4,155,482 | A * | 5/1979 | Swaney | B65D 90/022 52/406.1 |
| 4,207,827 | A * | 6/1980 | Gondouin | B63B 73/60 114/77 R |
| 4,461,398 | A * | 7/1984 | Argy | F17C 13/001 52/249 |
| 6,199,497 | B1 * | 3/2001 | Dhellemmes | B63B 25/16 220/901 |
| 8,783,501 | B2 * | 7/2014 | Mookerjee | F17C 3/02 52/745.1 |
| 9,291,308 | B2 * | 3/2016 | Ezzarhouni | F17C 3/022 |
| 9,440,712 | B2 * | 9/2016 | Bougault | F17C 3/025 |
| 9,963,207 | B2 * | 5/2018 | Nikolaisen | F17C 3/04 |
| 10,267,455 | B2 * | 4/2019 | Sassi | F17C 9/00 |
| 10,279,992 | B2 * | 5/2019 | Lisin | B65D 81/3816 |
| 10,578,248 | B2 * | 3/2020 | Delanoe | F17C 3/027 |
| 10,876,687 | B2 * | 12/2020 | Philippe | B65D 90/22 |
| 11,796,130 | B2 * | 10/2023 | Durand | F17C 13/126 |
| 2017/0138537 | A1 * | 5/2017 | Sassi | F17C 6/00 |
| 2021/0062972 | A1 * | 3/2021 | Jean | F17C 9/00 |
| 2022/0373133 | A1 * | 11/2022 | Deletre | F17C 3/027 |

* cited by examiner

SEALED AND THERMALLY INSULATING TANK COMPRISING ANTI-CONVECTIVE FILLING ELEMENTS

CROSS-REFERENCE TO RELATED APPLICATIONS

This application is the U.S. national stage application of International Patent Application No. PCT/EP2021/061023, filed Apr. 27, 2021, which claims the benefit under 35 U.S.C. § 119 of French Application No. 2004425, filed May 5, 2020, the disclosures of each of which are incorporated herein by reference in their entirety.

TECHNICAL FIELD

The invention relates to the field of tanks, sealed and thermally insulating, with membranes, for storing and/or transporting fluid, such as liquefied gas.

Sealed and thermally insulating tanks with membranes are used in particular for storing liquefied natural gas (LNG), which is stored, at atmospheric pressure, at approximately −162° C. These tanks can be installed on land or on a floating structure. In the case of a floating structure, the tank can be intended for transporting liquefied natural gas or for accommodating liquefied natural gas used as fuel for propelling the floating structure.

TECHNOLOGICAL BACKGROUND

In the prior art, sealed and thermally insulating tanks for storing liquefied natural gas are known, built into a supporting structure, such as the double hull of a vessel intended for transporting liquefied natural gas. Such tanks generally include a multi-layer structure, having successively, in the direction of thickness, from the outside to the inside of the tank, a secondary thermal insulation barrier retained at the supporting structure, a secondary sealing membrane resting against the secondary thermal insulation barrier, a primary thermal insulation barrier resting against the secondary sealing membrane and a primary sealing membrane resting against the primary thermal insulation barrier and intended to be in contact with the liquefied natural gas contained in the tank.

The primary sealing membrane consists of corrugated metal plates. The metal plate, rectangular in shape, includes a first series of parallel corrugations, called low, extending along a direction y from one edge of the plate to the other and a second series of parallel corrugations, called high, extending along a direction x from one edge of the metal plate to the other. The directions x and y of the series of corrugations are perpendicular. The corrugations protrude on the side of an internal face of the metal plate, intended to be placed in contact with the fluid contained in the tank. The corrugated metal plates have flat portions between the corrugations.

The corrugations of the primary sealing membrane thus form circulation channels for a gas present in the primary thermally insulating barrier. Furthermore, one of the directions x or y is parallel to the direction of greater slope for an inclined wall.

As the primary sealing membrane is at very low temperatures and the secondary sealing membrane or the supporting structures at higher temperatures, it was found that a thermosiphon phenomenon was taking place in the inclined walls forming an angle with a horizontal direction, for example vertical walls of the tank, with circulation of a gas (or gas mixture) undergoing cooling, therefore descending with respect to the vertical direction, between the primary sealing membrane and the primary thermally insulating barrier (in the channels formed by the corrugations) and circulation of a gas undergoing heating, therefore rising with respect to the vertical direction, between the secondary sealing membrane and the secondary thermally insulating barrier or between the secondary thermally insulating barrier and the supporting wall. The circulation of gas undergoing cooling and the circulation of gas undergoing heating form a closed circuit at the ends of the wall of the tank, which assists the transfer of convective heat through the wall of the tank.

It was also found that a multitude of loops of the thermosiphon phenomenon were forming at the bottom tank wall between the different insulating panels.

This thermosiphon effect does not allow the thermally insulating barrier to fulfill its insulating role in an effective way and can therefore damage the outer structure of the tank by propagating the extreme temperatures of the tank contents to same.

The invention aims to remedy this problem.

SUMMARY

An idea at the base of the invention is to propose a sealed and thermally insulating tank with sealing membrane including corrugations in which the phenomena of convection or thermosiphon are reduced. In particular, an idea at the base of the invention is to provide a sealed and thermally insulating tank limiting the presence of continuous circulation channels in the thermal insulation barriers so as to limit the phenomena of natural convection in said thermal insulation barriers.

According to an embodiment, the invention provides a sealed and thermally insulating tank for storing a liquefied gas, in which the tank includes a bottom wall, a ceiling wall and peripheral walls connecting the bottom wall to the ceiling wall so as to form a polyhedral tank, the peripheral walls including a sealing membrane intended to be in contact with the liquefied gas contained in the tank and at least one thermal insulation barrier arranged between the sealing membrane and a supporting wall of a supporting structure, the thermal insulation barrier including a plurality of juxtaposed insulating panels,

- wherein the sealing membrane includes corrugated metal plates juxtaposed to each other and comprising a first series of parallel corrugations, extending along a direction x and a second series of parallel corrugations extending along a direction y, the direction x being a direction of greater slope of the peripheral wall, the corrugations protruding towards the inside of the tank and forming channels for circulating a gas present in the thermally insulating barrier,
- wherein the peripheral walls comprise filling elements with pressure loss, which are disposed in the corrugations of the first series of corrugations so as to obstruct the circulation channel of said corrugations, so as to form a belt of filling elements embodied in a plane parallel to the bottom wall and extending all round the tank, the belt being formed of at least one obstruction part where each corrugation of the first series of corrugations is obstructed by one of the filling elements, and of at least one discontinuation part configured to allow the gas present in the circulation channels to circulate through the belt of filling elements, said or each obstruction part being delimited by said or two discontinuation parts, the belt of filling elements including at most one discontinuation part per peripheral wall, and the filling elements being configured to generate a pressure loss reducing a gaseous flow passing through said circulation channel, the filling elements of the obstruction part of the at least one belt of filling elements being inclusively disposed between two adjacent corrugations of the second series of corrugations.

Thanks to these characteristics, the flow of gas situated in the circulation channels of the corrugations, which on cooling would be caused to descend in the peripheral walls, is blocked here from circulating by the filling elements with pressure loss disposed in the obstruction part of the belt of filling elements. This flow of gas is thus forced to pass through the discontinuation part or parts so as to pass through the belt of filling elements. The belt of filling elements therefore implements a singular pressure loss on this flow by suddenly reducing the passage section of the flow over the entire wall, inhibiting the thermosiphon effect from becoming established in the peripheral walls.

The expression "being inclusively disposed between two adjacent corrugations of the second series of corrugations" means that the filling elements of the obstruction part are situated in the direction x in a space formed by two adjacent corrugations of the second series of corrugations including the limits of the space. Each filling element of the obstruction part can therefore be situated at one of the corrugations of the second series of corrugations, the other corrugation of the second series of corrugations, or between these two corrugations.

According to embodiments, such a tank can include one or more of the following characteristics.

According to an embodiment, the filling elements are configured to generate a pressure loss reducing a gaseous flow passing through said circulation channel by at least 80%.

Thus, these filling elements with pressure loss therefore consist in plugs formed in the corrugations causing a pressure loss on an outflow such that the pressure loss P is greater than or equal to 80% of:

$$(\rho(Tf)-\rho(Tc))\times g\times h,$$

with Tc and Tf the temperatures of the hot and cold branches of the thermosiphon, ρ the density of the outflow, and h the largest dimension of the thermosiphon loop according to gravity. According to a possibility offered by the invention, the temperature of the hot branch is measured at the very top of the loop under the insulation barrier while the temperature of the cold branch is measured at the very bottom of the mouth in a circulation channel. In this case, it is the extreme temperatures of the hot branch and of the cold branch that are measured, but of course, it is possible to envisage a different measurement configuration for these two temperature measurements.

This pressure loss can be engendered by a particular geometry of the filling element, and/or a particular constituent material of the filling element, this material having a suitable coefficient of permeability.

According to an embodiment, the filling elements are made in a gas-proof material.

According to an embodiment, the filling elements of the obstruction part of the at least one belt of filling elements are aligned with each other along the direction y.

According to an embodiment, the direction y is perpendicular to the direction x.

According to an embodiment, the tank comprises a plurality of belts of filling elements spaced from each other by a pitch substantially equal to a dimension of the insulating panels in the direction x.

By multiplying the number of belts of filling elements over the height of the tank, it is therefore possible to increase the pressure loss the flow of gas encounters while descending through the circulation channels.

According to an embodiment, the at least one discontinuation part of a belt of filling elements is offset in the direction y with respect to the discontinuation parts of the belts of filling elements adjacent to said belt of filling elements, for example, an offset greater than or equal to one third of the dimension of the peripheral wall in the direction y.

According to an embodiment, the at least one discontinuation part is situated close to an edge of a said peripheral wall, the discontinuation parts of two adjacent belts of filling elements being disposed either side of the peripheral wall.

The discontinuation parts therefore form a staggered grid on the peripheral wall such as to force the flow of gas to take a route comprising a plurality of elbows, which makes it possible to increase the pressure loss.

According to an embodiment, the belts of filling elements comprise a single discontinuation part, the discontinuation parts of two adjacent belts of filling elements being situated on peripheral walls opposite each other.

The disposition of the discontinuation parts therefore makes it possible to force the flow to take a much longer route to descend along the peripheral wall and it therefore takes a diverted route in a horizontal plane with each passage of a belt of filling elements.

According to an embodiment, said discontinuation part is disposed in adjacent corrugations of the first series of corrugations situated at a single insulating panel, said adjacent corrugations being without filling elements.

According to an embodiment, said discontinuation part is situated in one to nine adjacent corrugations of the first series of corrugations, said one to nine corrugations being without filling elements.

It should be noted that an insulating panel situated under the corrugated metal plates can advantageously be of a dimension allowing from three to nine corrugations of the first series of corrugations to be accommodated according to its orientation. It is therefore envisaged that the discontinuation part is formed only on one of the insulating panels so as to simplify the construction of the tank wall but also to limit the size of the discontinuation part so that same can fulfill its pressure loss role.

According to an embodiment, the at least one discontinuation part is situated in a plurality of adjacent corrugations, preferably three to nine corrugations, the discontinuation part including a staggered grid of filling elements, the staggered grid being configured to create a fluidic communication path between the circulation channels situated below the belt of filling elements and the circulation channels situated above the belt of filling elements, said fluidic communication path including a plurality of bends.

According to an embodiment, the filling elements are made in closed cell polymer foam.

According to an embodiment, the filling elements are made in polystyrene or polyethylene foam.

According to an embodiment, the filling elements have a density between 10 and 50 $kg/m^3$, preferably between 20 and 30 $kg/m^3$.

According to an embodiment, the filling elements have a modulus of elasticity at ambient temperature between 1 MPa and 45 MPa in accordance with Standard ISO844, preferably between 1 MPa and 30 MPa.

According to an embodiment, the filling elements have a yield strength between 0.02 MPa and 1 MPa in accordance with Standard ISO844.

According to an embodiment, the filling elements are situated above, below or at a corrugation node in the direction of greater slope, the corrugation node being formed by an intersection between a corrugation of the first series of corrugations and a corrugation of the second series of corrugations.

The filling elements of the obstruction part of a single belt are therefore substantially aligned in the direction x while being situated between two corrugations of the second series of corrugations, including as possible positions of the filling elements the corrugation nodes formed by the intersection of said two corrugations of the second series of corrugations with the corrugation of the first corrugation series.

According to an embodiment, the filling elements of the obstruction part are situated at a corrugation node.

According to an embodiment, the filling elements of the discontinuation part are situated between two corrugation nodes.

According to an embodiment, the filling element includes a single section extending in the direction x, the section having an upper face turned towards the corrugation to close and a lower face turned towards the insulating panel, the lower face being flat so as to rest on the insulating panel, the upper face being domed and being configured to have a shape complementing the corrugation to close.

According to an embodiment, the filling element includes a single section extending in the direction y and two second sections extending in the direction x and situated either side of the first section so as to form an X-shaped filling element, the first section and the second section each having an upper face turned towards the corrugation to close and a lower face turned towards the insulating panel, the lower face being flat so as to rest on the insulating panel, the upper face being domed and being configured to have a shape complementing the corrugation to close.

According to an embodiment, on an upper face turned towards the corrugation to close, the filling elements comprise at least one beading extending in the direction y, the at least one beading being configured to be compressed during assembly so as to form a seal.

According to an embodiment, the filling elements comprise a beading on each second section and two beadings either side of the first section.

According to an embodiment, the sealing membrane is a primary sealing membrane and the thermally insulating barrier is a primary thermally insulating barrier, said juxtaposed insulating panels being primary insulating panels, the tank walls further comprising, successively in a direction of thickness, a secondary thermal insulating barrier including a plurality of juxtaposed secondary insulating panels, the secondary insulating panels being held against the supporting wall of the supporting structure, and a secondary sealing membrane supported by the secondary thermal insulating barrier and disposed between the secondary thermally insulating barrier and the primary thermally insulating barrier such that the primary insulating panels are held against the secondary sealing membrane.

According to an embodiment, the bottom wall comprises a sealing membrane intended to be in contact with the liquefied gas contained in the tank and at least one thermal insulation barrier arranged between the sealing membrane and a supporting wall of a supporting structure, the thermal insulation barrier including a plurality of juxtaposed insulating panels,

- wherein the sealing membrane of the bottom wall includes corrugated metal plates juxtaposed to each other and comprising a first series of parallel corrugations, extending along a first direction and a second series of parallel corrugations extending along a second direction, the corrugations protruding towards the inside of the tank and forming channels for circulating a gas present in the thermally insulating barrier, According to an embodiment, the bottom wall comprises filling elements with pressure loss, which are disposed in the corrugations of the first series of corrugations or of the second series of corrugations so as to obstruct the circulation channel of said corrugations, the filling elements being distributed over the entire bottom wall so as to form a staggered grid of filling elements in the circulation channels of the bottom wall, and the filling elements being configured to ensure a pressure loss reducing a gaseous flow passing through said circulation channel by at least 80%.

According to an embodiment, the first direction is perpendicular to the second direction.

According to an embodiment, the tank comprises filling elements with pressure loss, which are disposed in the corrugations of the first series of corrugations or of the second series of corrugations in each tank angle formed by the intersection of the bottom wall and one of the peripheral walls so as to obstruct the circulation channel of said corrugations, the filling elements forming an edge belt, the edge belt being formed all round the bottom wall at said angles.

In the event of natural convection phenomena called thermosiphon being present in the peripheral walls, the edge belt therefore makes it possible to limit the propagation of these natural convection phenomena to the bottom wall.

According to an embodiment, each corrugation of the first series of corrugations and of the second series of corrugations of the bottom wall is aligned with a corrugation of the first series of corrugations of a peripheral wall so as to form continuous circulation channels crossing the angles of the tank, the filling elements of the edge belt being disposed in each of said continuous circulation channels.

According to an embodiment, the filling elements of the edge belt are disposed at a first end and at a second end, opposite the first end, of each corrugation of the first series of corrugations and of the second series of corrugations of the bottom wall, the first end and the second end being situated close to one of the tank angles formed by the bottom wall and one of the peripheral walls.

According to an embodiment, the filling elements of the edge belt are disposed close to a tank angle formed by the bottom wall and one of the peripheral walls, alternating between an end of a corrugation of one of the series of corrugations of the bottom wall and an end of a corrugation of the first series of corrugations of a peripheral wall.

According to an embodiment, the invention provides a sealed and thermally insulating tank for storing a liquefied gas, in which the tank includes a bottom wall, a ceiling wall and peripheral walls connecting the bottom wall to the ceiling wall so as to form a polyhedral tank, the bottom wall including a sealing membrane intended to be in contact with the liquefied gas contained in the tank and at least one thermal insulation barrier arranged between the sealing membrane and a supporting wall of a supporting structure, the thermal insulation barrier including a plurality of juxtaposed insulating panels, wherein the sealing membrane includes corrugated metal plates juxtaposed to each other and comprising a first series of parallel corrugations, extending along a direction x and a second series of parallel corrugations extending along a direction y and inclined with respect to the direction y, the corrugations protruding towards the inside of the tank and forming channels for circulating a gas present in the thermally insulating barrier, wherein the bottom wall comprises filling elements with pressure loss, which are disposed in the corrugations of the first series of corrugations or of the second series of corrugations so as to obstruct the circulation channel of said corrugations, the filling elements being distributed over the entire bottom wall so as to form a staggered grid of filling elements in the circulation channels of the bottom wall, and the filling elements being configured to ensure a pressure loss reducing a gaseous flow passing through said circulation channel by at least 80%.

Such a tank can be part of a storage installation on land, for example for storing LNG or it can be installed in a floating structure, coastal or in deep water, in particular a LNG tanker, a floating storage and regasification unit (FSRU), a floating production storage and offloading unit (FPSO) and others. Such a tank can also serve as a fuel tank in any kind of vessel.

According to an embodiment, a vessel for transporting a cold liquid product includes a double hull and an aforementioned tank disposed in the double hull.

According to an embodiment, the invention also provides a system for transferring a cold liquid product, the system including the aforementioned vessel, insulated pipes arranged so as to connect the tank installed in the hull of the vessel to a floating or land storage installation and a pump for sending a flow of cold liquid product through the insulated pipes from or to the floating or land storage installation to or from the tank of the vessel.

According to an embodiment, the invention also provides a method for loading or unloading such a vessel, whereby a cold liquid product is fed through insulated pipes from or to a floating or land storage installation to or from the tank of the vessel.

BRIEF DESCRIPTION OF THE FIGURES

The invention will be better understood, and other aims, details, characteristics and advantages of same will appear more clearly during the following description of several particular embodiments of the invention, given only as an illustration and non-limitative, with reference to the attached drawings.

DESCRIPTION OF THE EMBODIMENTS

Figure 1:
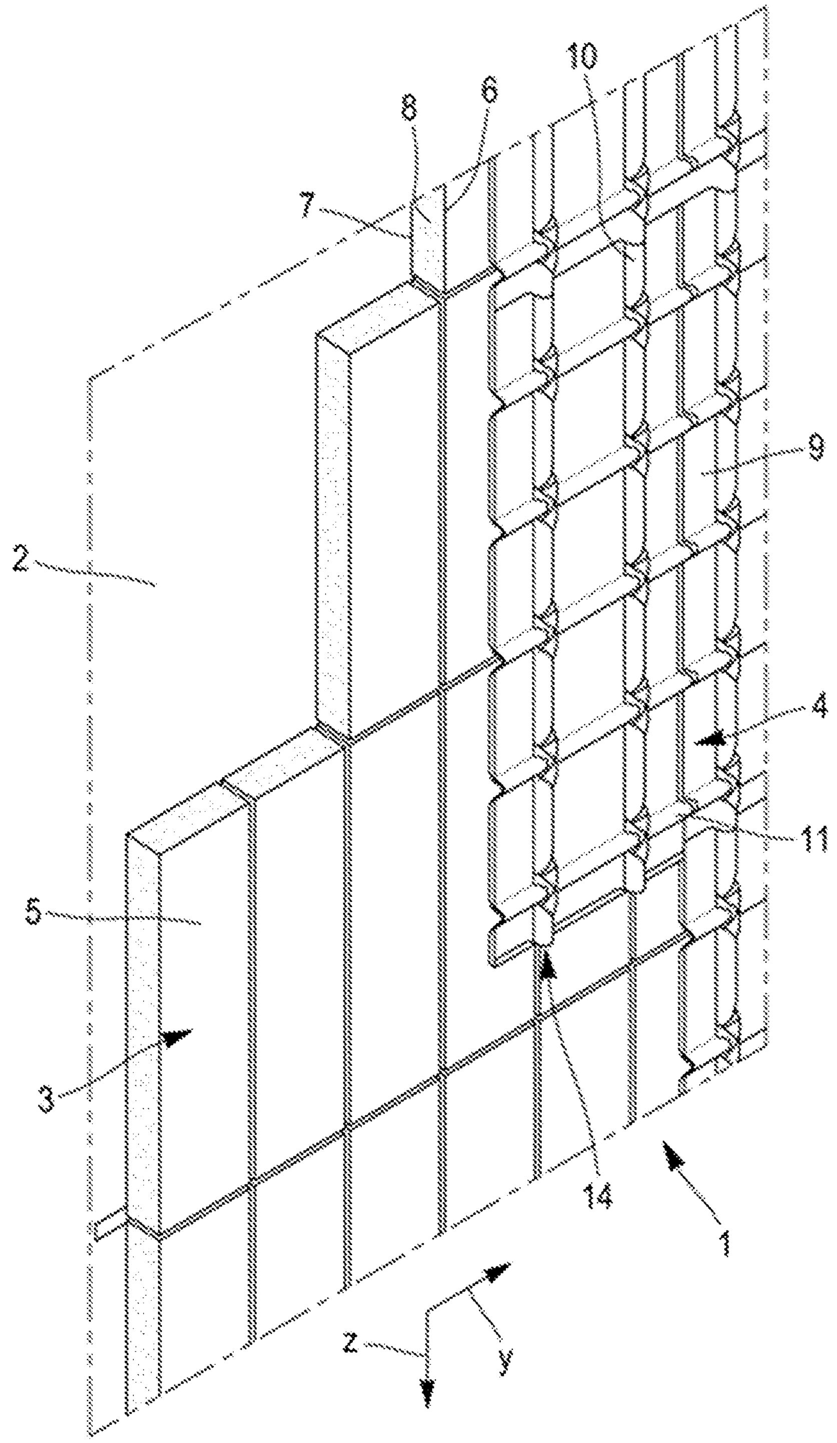
FIG. 1 is a skinned perspective view of a peripheral tank wall according to an embodiment.

The description below will describe a sealed and thermally insulating tank 71 for storing liquefied gas, comprising a bottom wall 12, a ceiling wall 13 and a plurality of peripheral walls 1 connecting the bottom wall 12 to the ceiling wall 13, walls 1, 12, 13 being fastened to a supporting structure 2. The peripheral walls are formed from vertical walls and potentially of inclined walls called chamfer walls. The particular case of a vertical wall is illustrated in FIG. 1. However, the invention is not limited to the particular case of a vertical wall, but to all the peripheral walls 1.

In the case of a vertical wall, the direction of greater slope of this wall is thus the vertical direction. The term "vertical" here means extending in the direction of the terrestrial gravity field. The term "horizontal" here means extending in a direction perpendicular to the vertical direction.

The liquefied gas intended to be stored in the tank 1 can in particular be a liquefied natural gas (LNG), that is to say a gaseous mixture including mostly methane and one or more other hydrocarbons. The liquefied gas can also be ethane or a liquefied petroleum gas (LPG), that is to say a mixture of hydrocarbons from oil refining including essentially propane and butane.

As shown in FIG. 1, the peripheral wall 1 has a multilayer structure including successively, in the direction of thickness from the outside to the inside of the tank 71, a thermally insulating barrier 3 held against the supporting wall 2 and a sealing membrane 4 supported by the thermally insulating barrier 3.

In the illustrated embodiment, the thermally insulating barrier 3 includes a plurality of insulating panels 5 that are anchored to the supporting wall 2 by means of retaining means or couplers (not illustrated). The insulating panels 5 have a general parallelepiped shape and are disposed in parallel rows. The insulating blocks 5 can be made according to different structures.

An insulating panel 5 can be embodied in the form of a box including a base plate, a cover plate and supporting shells extending, in the direction of thickness of the tank wall, between the base plate and the cover plate and delimiting a plurality of compartments filled with an insulating filling, such as perlite, glass wool or rock wool. Such a general structure is described is described for example in WO2012/127141 or WO2017/103500.

An insulating panel 5 can also be embodied a base plate 7, a cover plate 6 and potentially an intermediate plate, for example made in plywood. The insulating block 5 also includes one or more layers of insulating polymer foam 8 sandwiched between the base plate 7, the cover plate 6 and the potential intermediate plate and bonded to same. The insulating polymer foam 8 can in particular be a foam based on polyurethane, optionally reinforced with fibers. Such a general structure is described for example in WO2017/006044.

The sealing membrane 4 consists of corrugated metal plates 9. These corrugated metal plates are for example in stainless steel whose thickness is approximately 1.2 mm and size 3 m by 1 m. The metal plate, rectangular in shape, includes a first series of parallel corrugations 10 extending in a direction x from one edge of the plate to the other, and a second series of parallel corrugations 11 extending in a direction y from one edge of the metal plate to the other. The directions x and y of the series of corrugations 10, 11 are perpendicular. The corrugations 10, 11 protrude for example on the side of the internal face of the metal plate, intended to be placed in contact with the fluid contained in the tank. The edges of the metal plate here are parallel to the corrugations. The corrugated metal plates include flat portions between the corrugations 10, 11. The intersection between a corrugation of the first series of corrugations 10 and a corrugation of the second series of corrugations 11 forms a corrugation node 20.

In the embodiment described above, a sealing membrane 4 and a thermally insulating barrier 3 have been illustrated and described. The tank wall 1 can therefore consist of a single sealing membrane 4 and a single thermally insulating barrier 3.

However, the tank wall 1 can also comprise a structure called structure with double membranes. In this case, the described thermally insulating barrier 3 is a primary thermally insulating barrier and the sealing membrane 4 is a primary sealing membrane. The tank wall 1 therefore also comprises a secondary thermally insulating barrier fastened to the supporting structure and a secondary sealing membrane supported by the secondary thermally insulating barrier and serving as a support for the primary thermally insulating barrier.

As explained previously, the corrugations of the first series 10 and of the second series 11 of the sealing membrane form circulating channels 14 for a gas present in the primary thermally insulating barrier. Furthermore, the channels 14 formed by the corrugations of the first series of corrugations 10 directed in the direction x, which is the direction of greater slope for an inclined wall, favor the circulation of gas by the thermosiphon effect.

So as to remedy this thermosiphon effect, in the embodiments described in the following, it is envisaged to locate, in the corrugations of the first series of corrugations 10 of the peripheral walls 1, filling elements with pressure loss 15, which are disposed in these corrugations 10 so as to obstruct the circulation channel 14 occasionally and therefore to cut off the circulation of the flow in this corrugation. So as to limit this thermosiphon effect throughout the tank, the filling elements with pressure loss 15 are disposed so as to form a plurality of belts 16 of filling elements. Each belt 16 of filling elements is embodied in a plane parallel to the bottom wall 12 and extending all round the tank 71 as visible in FIGS. 2 and 3.

Figure 2:
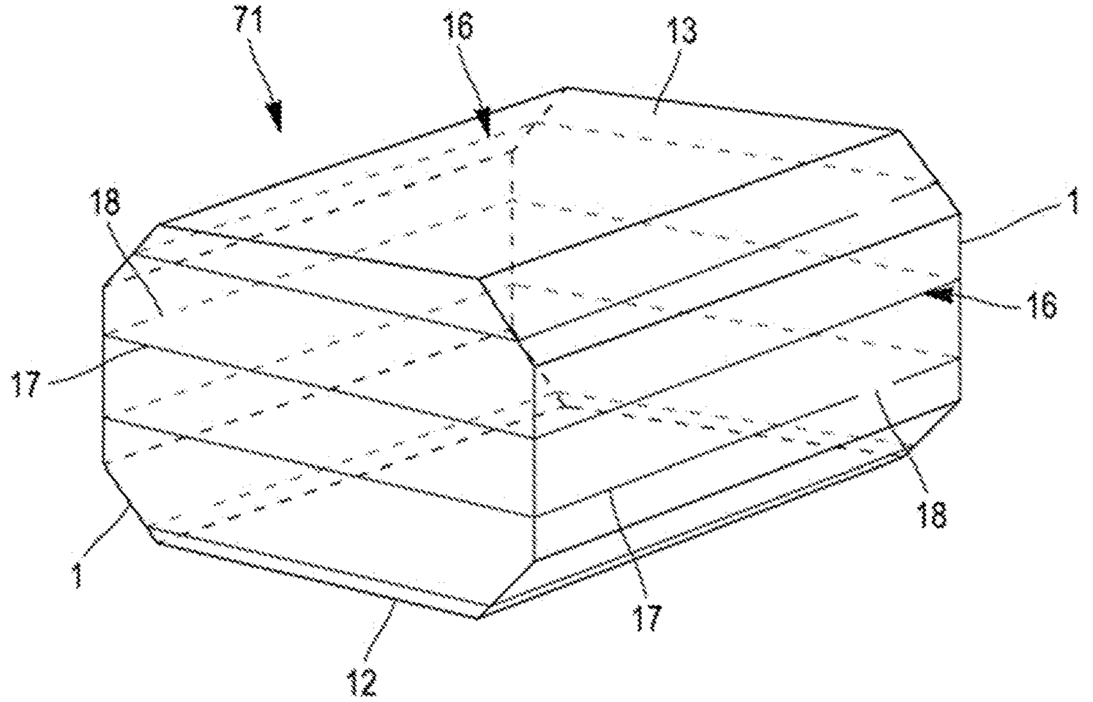
FIG. 2 is a schematic perspective view of a sealed and thermally insulating polyhedral tank according to a first embodiment.

FIG. 2 schematically illustrates a tank 71 equipped on the peripheral walls 1 with a plurality of belts 16 of filling elements according to a first embodiment. In fact, the details of the walls of the tank are not illustrated. Furthermore, for reasons of legibility of FIGS. 2 and 3, only some belts 16 of filling elements are illustrated without reflecting the real number of envisaged belts 16 of filling elements. In fact, it is advantageously envisaged that the belts 16 of filling elements are spaced from each other in the direction of greater slope by a pitch substantially equal to a dimension of the insulating panels 5 in the direction of greater slope.

As visible on FIG. 2, in the first embodiment, the belts 16 of filling elements include an obstruction part 17 and a discontinuation part 18. In the obstruction part 17, each corrugation of the first series of corrugations 10 is occasionally closed by one of the filling elements 15. This obstruction part 17 therefore makes it possible to cut off completely the descent of a flow of gas through the circulation channels 14. However, in the discontinuation part 18, the circulation of the gas present in the circulation channels 14 through the belt 16 of filling elements is possible so as advantageously to inhibit the formation of a gas pocket in the thermally insulating barrier 3 by allowing the flow of gas to circulate. The design of the discontinuation part 18 can be implemented according to different variants illustrated in FIGS. 4 to 6.

So that the discontinuation part 18 does not allow the thermosiphon effect to become established, it is advantageous to limit the number and/or the size of the discontinuation parts 18 throughout the tank. It therefore seems advantageous that a belt 16 of filling elements does not include more than one discontinuation part 18 per peripheral wall 1.

In the first embodiment of FIG. 2, so as to limit the thermosiphon effect as much as possible, each belt 16 of filling elements comprises a single discontinuation part 18 so as to authorize the flow to pass over a single zone all round the tank 71 for each belt 16 of filling elements. Furthermore, the discontinuation parts 18 of two adjacent belts 16 of filling elements are situated on peripheral walls 1 opposite each other so as to force the flow of gas passing through these discontinuation parts 18 to take the longest route in order to reach the next discontinuation part 18.

Figure 3:
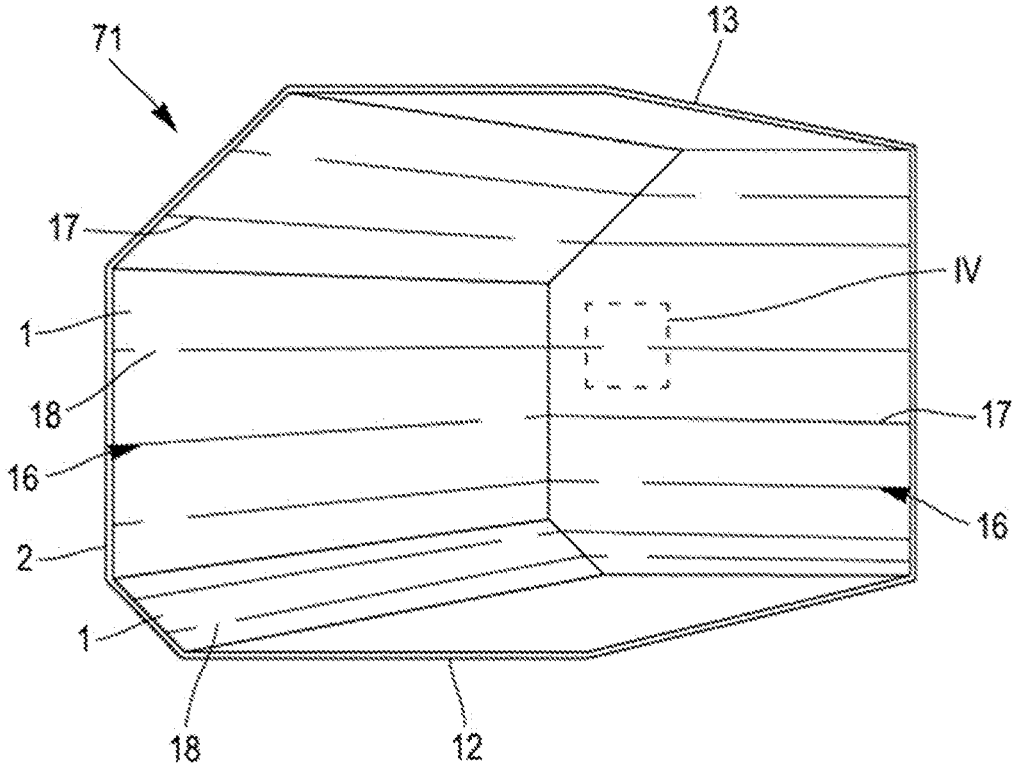
FIG. 3 is schematic skinned perspective view of a sealed and thermally insulating polyhedral tank according to a second embodiment.

FIG. 3 partially and schematically illustrates a tank 71 equipped on the peripheral walls 1 with a plurality of belts 16 of filling elements according to a second embodiment.

Contrary to the first embodiment, the second embodiment envisages that a single belt 16 of filling elements includes a plurality of obstruction parts 17 and a plurality of discontinuation parts 18 all round the tank, while respecting a single discontinuation part per peripheral wall 1. Each obstruction part 17 defines an obstruction zone delimited by two discontinuation parts 18. In this embodiment, so as to maximize the route of the flow of gas and thus the pressure loss engendered on this flow, the discontinuation parts 18 of two adjacent belts 16 of filling elements are disposed either side of the peripheral wall 1, for example as illustrated on FIG. 3, by placing them close to opposite edges of the peripheral wall 1. The discontinuation parts 18 are therefore staggered on a single peripheral wall 1.

FIGS. 4 to 7 illustrate a portion of a belt 16 of filling elements, in particular at the junction between the obstruction part 17 and the discontinuation part 18 according to several embodiment variants. In each of these variants, the filling elements 16 of an obstruction part 17 are situated at a corrugation node 20. However, in variants not illustrated, the filling elements 16 of an obstruction part 17 could be situated above or below a corrugation node 20 provided that same remain substantially aligned in the direction y and on a single peripheral wall.

It should be noted that an insulating panel 5 situated under the corrugated metal plates 9 has a dimension making it possible, according to its orientation, to accommodate three to nine corrugations of the first series of corrugations 10. On FIGS. 4 to 6, the insulating panels 5 are illustrated such that their largest dimension is turned in the direction y and therefore accommodating nine corrugations of the first series of corrugations 10.

Figure 4:
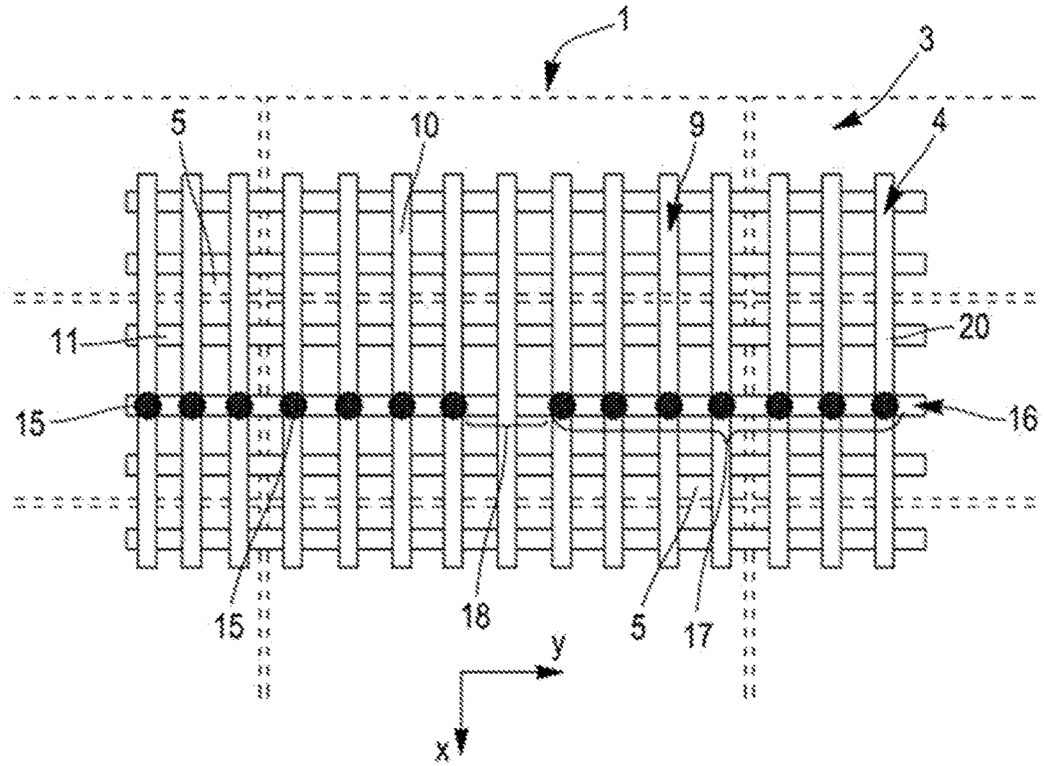
FIG. 4 shows a view of detail IV of FIG. 3 illustrating a discontinuation part and an obstruction part of the belt of assembly elements according to a first variant.

In the first variant illustrated on FIG. 4, the discontinuation part 18 is situated in a single corrugation of the first series of corrugations 10, which is therefore without filling elements 15. However, in variants not illustrated, the discontinuation part 18 could be situated in a maximum of nine corrugations of the first series of corrugations 10, these corrugations therefore being without filling elements 15 at the belt 16 of filling elements.

Figure 5:
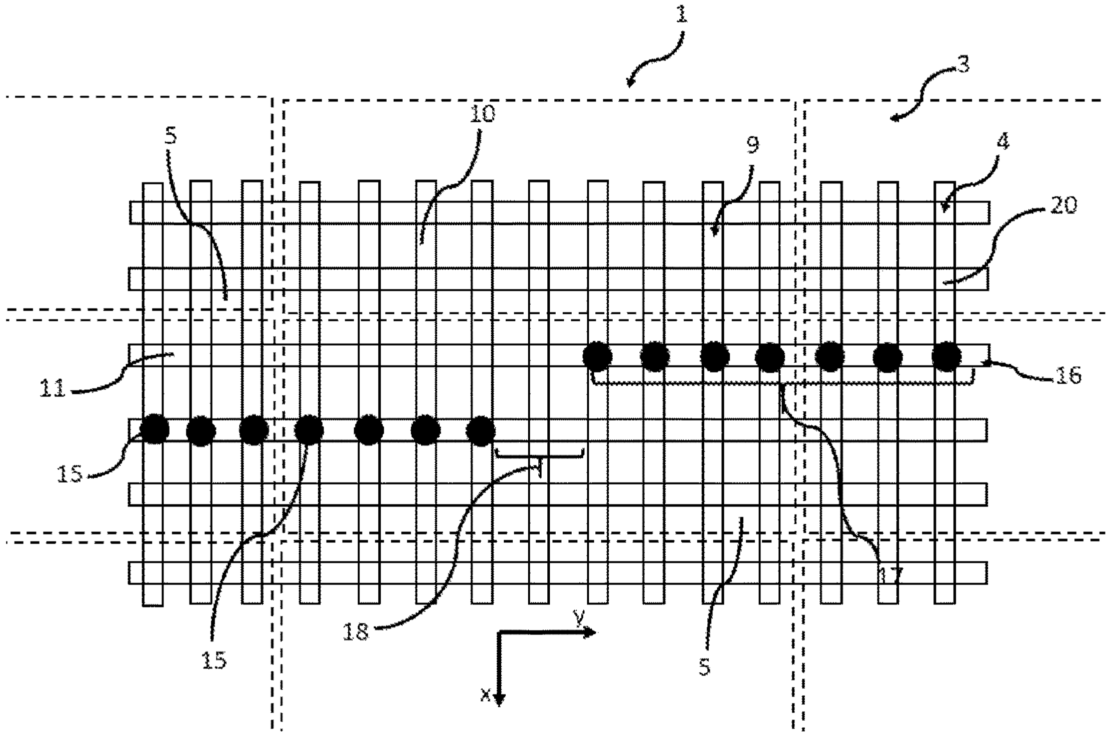
FIG. 5 shows a view of detail IV of FIG. 3 illustrating a discontinuation part and an obstruction part of the belt of assembly elements according to a second variant.

In the second variant illustrated on FIG. 5, the discontinuation part 18 is identical to the first variant. However, the obstruction parts 17 situated either side of the discontinuation part 18 are not aligned with respect to each other in the direction y as in the first variant but offset by one corrugation in the direction x. This offset between two adjacent obstruction parts 17 could be of nine corrugations of the second series of corrugations 11 at most.

Figure 6:
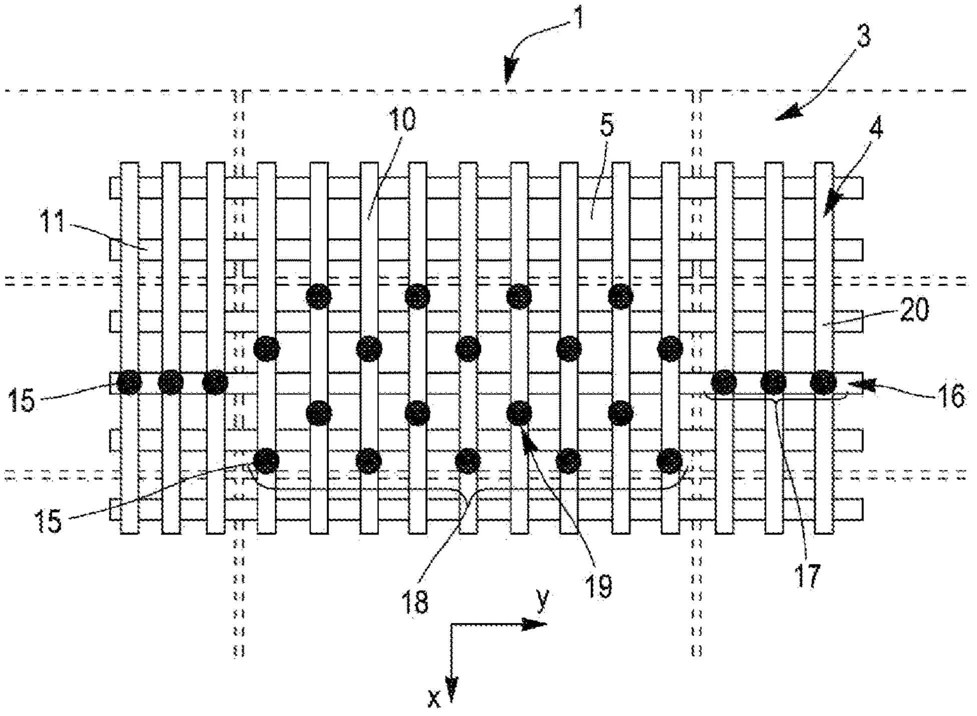
FIG. 6 shows a view of detail IV of FIG. 3 illustrating a discontinuation part and an obstruction part of the belt of assembly elements according to a third variant.

In the third variant illustrated in FIG. 6, contrary to the first variant, the discontinuation part 18 is not formed by the absence of filling elements 15. In fact, in this variant, the discontinuation part 18 is situated in nine corrugations of the first series of corrugations 10, the discontinuation part 18 here including a staggered grid 19 of filling elements 15. The staggered grid 19 is implemented so as to create a fluidic communication path between the circulation channels 14 situated below the belt 16 of filling elements and the circulation channels 14 situated above the belt 16 of filling elements. The fluidic communication path is thus formed of a plurality of bends through the staggered grid 19. The filling elements 15 of the discontinuation part 18 are situated between two corrugation nodes 20.

Figure 7:
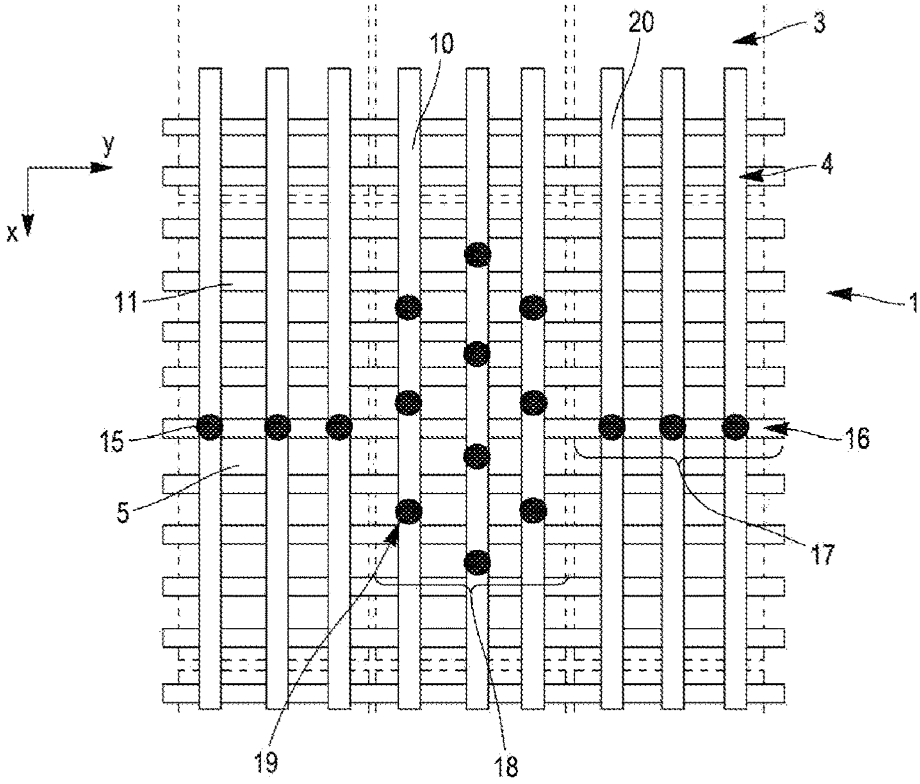
FIG. 7 shows a view of detail IV of FIG. 3 illustrating a discontinuation part and an obstruction part of the belt of assembly elements according to a fourth variant.

On FIG. 7, the insulating panels 5 are shown such that their largest dimension is turned in the direction x and therefore accommodating three corrugations of the first series of corrugations 10.

The fourth variant illustrated in FIG. 7 is therefore similar to the third variant in fitting the staggered grid 19 to a discontinuation part 18 formed here by three corrugations of the first series of corrugations 10.

Figure 8:
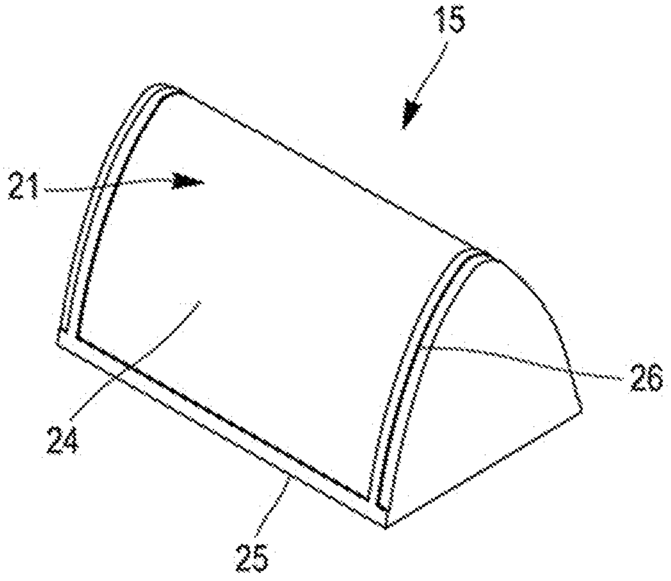
FIG. 8 is a perspective view of a filling element according to an embodiment.
Figure 9:
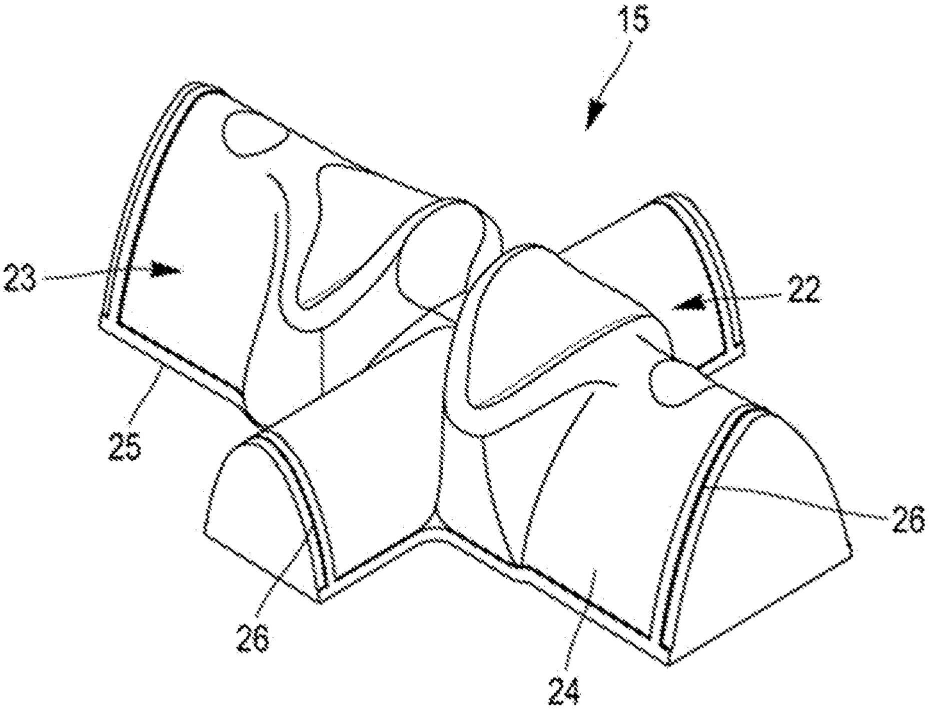
FIG. 9 is a perspective view of a filling element according to another embodiment.

FIGS. 8 and 9 show two different designs of a filling element 15 depending on whether it is located in a corrugation node 20 or in a portion of a corrugation of the first series of corrugations 10.

The filling element 15 of FIG. 8 is therefore suitable for being located in a portion of a corrugation of the first series of corrugations 10 away from a corrugation node 20. This filling element 15 includes a single section 21 extending in the direction x after being placed in the corrugation. The section 21 comprises an upper face 24 turned towards the corrugation to close and a lower face 25 turned towards the insulating panel 5. The lower face 25 is flat so as to rest on the insulating panel 5. The upper face 24 is domed and is configured to have a shape complementing the corrugation to close. Furthermore, on the upper face 24, the section 21 includes two beadings 26 either side of same, forming a protuberance and serving as a seal when compressed by the corrugation during assembly.

The filling element 15 of FIG. 9 is therefore suitable for being located in a corrugation node 20. This filling element 15 includes a first section 22 extending in the direction y after being placed in the corrugation and two second sections 23 extending in the direction x and situated either side of the first section 22, so as to form an X-shaped filling element. The first section 22 and the second sections 23 each have an upper face 24 turned towards the corrugation to close and a lower face 25 turned towards the insulating panel 5. The lower face 25 is flat so as to rest on the insulating panel 5 and the upper face 24 is domed so as to have a shape complementing the corrugation to close. Furthermore, on the upper face 24, the filing element 15 comprises a beading 26 on each second section 23 and two beadings 26 either side of the first section 22.

Figure 11:
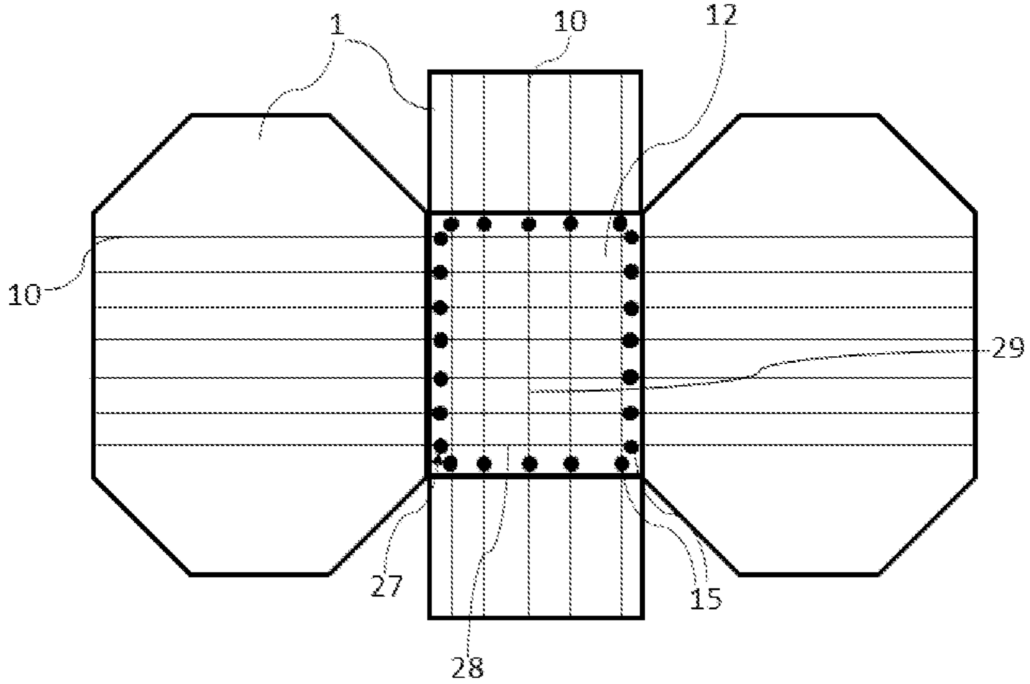
FIG. 11 is a schematic unfolded view of a tank where only the bottom wall and the peripheral walls connected to the bottom wall have been illustrated with an edge belt according to a first embodiment.
Figure 12:
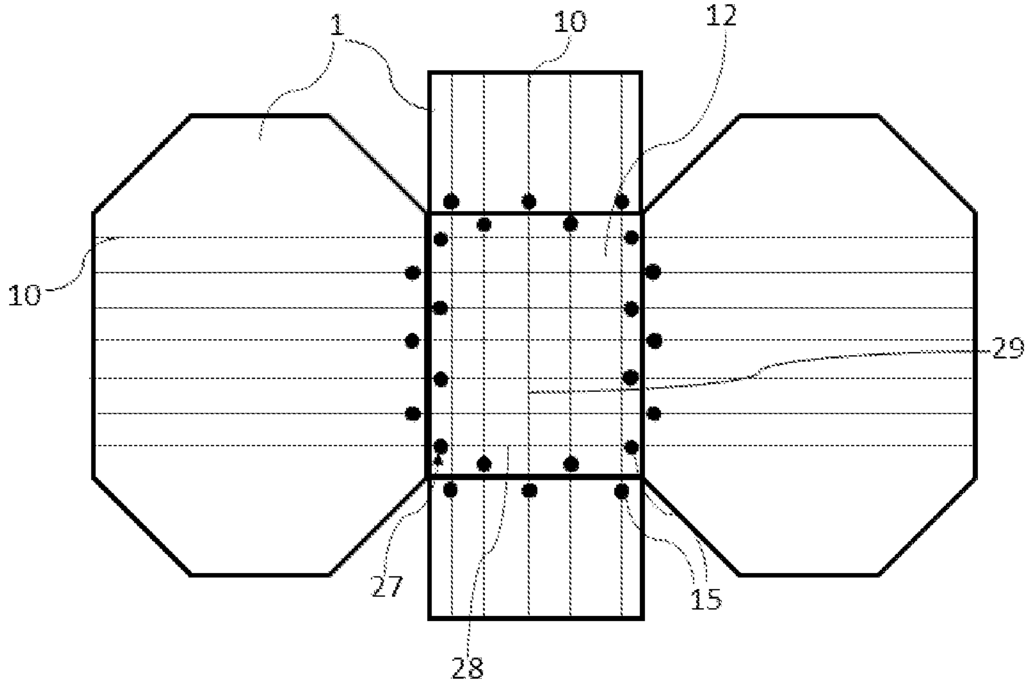
FIG. 12 is a schematic unfolded view of a tank where only the bottom wall and the peripheral walls connected to the bottom wall have been illustrated with an edge belt according to a second embodiment.

FIGS. 11 and 12 schematically and partially show a tank 71 with chamfer, which has been unfolded so as to illustrate the bottom wall 12 in its center, and the peripheral walls 1 connected to the bottom wall 12, namely in the case of a tank 71 equipped with chamfers, two vertical cofferdam walls and two lower chamfer walls inclined for example at 135°. In another embodiment not illustrated, the tank can also be without chamfers so that the peripheral walls connected to the bottom wall 12 are two vertical cofferdam walls and two lateral vertical walls.

On the peripheral walls 1, only the corrugations of the first series of corrugations 10, which have continuity with the corrugations of the bottom wall 12, have been shown. The corrugations of the first series of corrugations 28 and of the second series of corrugations 29 of the bottom wall have been shown. The number of corrugations of each wall 1, 12 is purely schematic so that the illustrations are legible.

On FIGS. 11 and 12, the tank 71 is equipped with an edge belt 27 consisting of a plurality of filling elements 15, which is formed all round the bottom wall 12 close to the angles of the tank formed by the intersection of the bottom wall 12 and one of the peripheral walls 1. The filling elements 15 of the edge belt 27 are disposed in the corrugations of the first series of corrugations 10, 28 or of the second series of corrugations 29 in each of the angles in order to obstruct the circulation channel of said corrugations. In the event of the presence of natural convection phenomena called thermosiphon in the peripheral walls 1, the edge belt 27 makes it possible to limit the propagation of these natural convection phenomena to the bottom wall 12. In fact, the edge belt 27 will allow the flows present in the peripheral walls 1 to be separated from the flows present in the bottom wall 12. The edge belt 27 is advantageously used to complement the belts 16 of filling elements situated all round the tank 71.

In the embodiments illustrated in FIGS. 11 and 12, each corrugation of the first series of corrugations 28 and of the second series of corrugations 29 of the bottom wall 12 is aligned with a corrugation of the first series of corrugations 10 of a peripheral wall 12 so as to form continuous circulation channels in the tank angles. The filling elements 15 of the edge belt 27 are therefore formed in each of said continuous circulation channels.

FIG. 11 more particularly shows a first embodiment of the edge belt 27. In this embodiment, the filling elements 15 of the edge belt 27 are formed at both ends of each corrugation of the first series of corrugations 28 and of the second series of corrugations 29 of the bottom floor 12. The ends of the corrugations of the bottom wall 12 are in fact situated close to one of the tank angles formed by the bottom wall and one of the peripheral walls and are connected to one end of a corrugation of a peripheral wall 1 by means of a connection plate (not illustrated) bent at an angle equal to the tank angle and including a corrugation aligned with the corrugation of the bottom wall 12 and the corrugation of the peripheral wall 1. In an embodiment not illustrated, the filling elements 15 of the edge belt 27 can also be situated in the corrugation of the connection plate.

FIG. 12 shows a second embodiment of the edge belt 27. In this embodiment, the filling elements 15 of the edge belt 27 are formed close to a tank angle, alternating between one end of a corrugation of one of the first series of corrugations 28, 29 of the bottom wall 12 and one end of a corrugation of the first series of corrugations 10 of a peripheral wall 1. The alternation illustrated here is implemented so as to have a filling element 15 on the bottom wall 12 then a filling element 12 on a peripheral wall 1. In other embodiments not illustrated, this alternation can be implemented differently, for example, two on one wall, then two on another wall.

Figure 10:
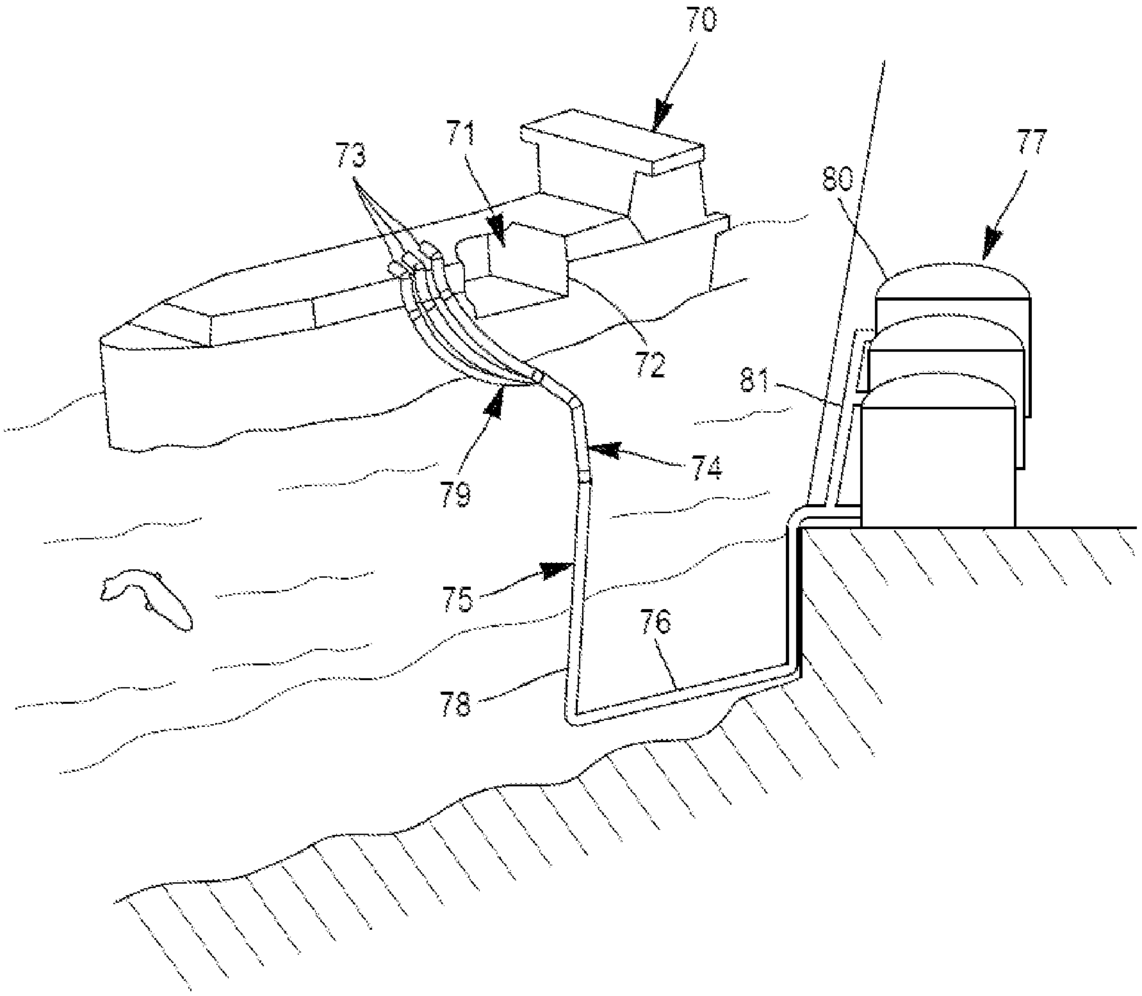
FIG. 10 is a skinned schematic illustration of a vessel including a tank and a loading/unloading terminal of this tank.

With reference to FIG. 10, a skinned view of a LNG tanker 70 shows a sealed and insulated tank 71 generally prismatic in shape assembled in the double hull 72 of the tanker. The wall of the tank 71 includes a primary sealed barrier intended to be in contact with the LNG contained in the tank, a secondary sealed barrier arranged between the primary sealed barrier and the double hull 72 of the tanker, and two insulating barriers arranged respectively between the primary sealed barrier and the secondary sealed barrier and between the secondary sealed barrier and the double hull 72.

In a manner known per se, loading/unloading pipes 73 disposed on the upper deck of the tanker can be connected, by means of suitable connectors, to a sea or port terminal so as to transfer an LNG cargo from or to the tank 71.

FIG. 10 illustrates a sea terminal example including a loading and unloading station 75, a submarine pipe 76 and an installation on land 77. The loading and unloading station 75 is a fixed offshore installation including a mobile arm 74 and a tower 78, which supports the mobile arm 74. The mobile arm 74 supports a loom of insulated flexible pipes 79 able to be connected to the loading/unloading pipes 73. The adjustable mobile arm 74 accommodates any size of LNG tanker. A connection pipe not illustrated extends inside the tower 78. The loading and unloading station 75 allows the LNG tanker 70 to be loaded and unloaded from or to the installation on land 77. Same includes storage tanks 80 for liquefied gas and connection pipes 81 connected by the submarine pipe 76 to the loading and unloading station 75. The submarine pipe 76 allows liquefied gas to be transferred between the loading and unloading station 75 and the installation on land 77 over a long distance, for example 5 km, which makes it possible to hold the tanker 70 a long distance from the shore during loading and unloading operations.

Pumps on board the tanker 70 and/or pumps equipping the installation on land 77 and/or pumps equipping the loading and unloading station 75 are used to generate the pressure needed for transferring the liquefied gas.

Although the invention has been described in connection with several particular embodiments, it is quite obvious that it is not at all limited to same and that it includes all the technical equivalents of the means described as well as combinations thereof if these enter into the framework of the invention.

The use of the verbs "include", "comprise" or "incorporate" and their conjugated forms does not exclude the presence of other elements or other steps than those stated in a claim.

In the claims, any reference sign between brackets could not be interpreted as a limit to the claim.

We claim:

1. A sealed and thermally insulating tank (71) for storing a liquefied gas, wherein the tank (71) includes a bottom wall (12), a ceiling wall (13) and peripheral walls (1) connecting the bottom wall (12) to the ceiling wall (13) so as to form a polyhedral tank (71), the peripheral walls (1) including a sealing membrane (4) intended to be in contact with the liquefied gas contained in the tank (71) and at least one thermal insulation barrier (3) arranged between the sealing membrane (4) and a supporting wall of a supporting structure (2), the thermal insulation barrier including a plurality of juxtaposed insulating panels (5), wherein the sealing membrane (4) includes corrugated metal plates (9) juxtaposed to each other and comprising a first series of parallel corrugations (10), extending along a direction x and a second series of parallel corrugations (11) extending along a direction y, the direction x being a direction of greater slope of the peripheral wall (1), the corrugations protruding towards the inside of the tank (71) and forming channels (14) for circulating a gas present in the thermally insulating barrier (3), wherein the peripheral walls (1) comprise filling elements (15) with pressure loss, which are disposed in the corrugations of the first series of corrugations (10) so as to obstruct the circulation channel (14) of said corrugations, so as to form a belt (16) of filling elements embodied in a plane parallel to the bottom wall (12) and extending all round the tank (71), the belt (16) of filling elements being formed of at least one obstruction part (17) where each corrugation of the first series of corrugations (10) is obstructed by one of the filling elements (15), and of at least one discontinuation part (18) configured to allow the gas present in the circulation channels (14) to circulate through the belt (16) of filling elements, said or each obstruction part (17) being delimited by said or two discontinuation parts (18), the belt (16) of filling elements including at most one discontinuation part (18) per peripheral wall (1), and the filling elements (15) being configured to generate a pressure loss reducing a gaseous flow passing through said circulation channel (14), the filling elements (15) of a said obstruction part (17) of the at least one belt (16) of filling elements being inclusively disposed each time between two adjacent corrugations of the second series of corrugations (11).

2. The tank (71) as claimed in claim 1, wherein the filling elements (15) of the obstruction part (17) of the at least one belt (16) of filling elements are aligned with each other along the direction y, the direction y being perpendicular to the direction x.

3. The tank (71) as claimed in claim 1, wherein the tank (71) comprises a plurality of belts (16) of filling elements spaced from each other by a pitch substantially equal to a dimension of the insulating panels (5) in the direction x.

4. The tank (71) as claimed in claim 3, wherein the at least one discontinuation part (18) is situated close to an edge of a said peripheral wall (1), the discontinuation parts (18) of two adjacent belts (16) of filling elements being disposed either side of the peripheral wall (1).

5. The tank (71) as claimed in claim 3, wherein the belts (16) of filling elements comprise a single discontinuation part (18), the discontinuation parts (18) of two adjacent belts (16) of filling elements being situated on peripheral walls (1) opposite each other.

6. The tank (71) as claimed in claim 1, wherein the at least one discontinuation part (18) is situated in one to nine corrugations of the first series of corrugations (10), said one to nine adjacent corrugations being without filling elements (15).

7. The tank (71) as claimed in claim 1, wherein the at least one discontinuation part (18) is situated in a plurality of corrugations of the first of corrugations (10), the discontinuation part (18) including a staggered grid (19) of filling elements (15), the staggered grid (19) being configured to create a fluidic communication path between the circulation channels (14) situated below the belt (16) of filling elements and the circulation channels (14) situated above the belt (16) of filling elements, said fluidic communication path including a plurality of bends.

8. The tank (71) as claimed in claim 1, wherein the filling elements (15) are made in closed cell polymer foam.

9. The tank (71) as claimed in claim 8, wherein the filling elements (15) are made in polystyrene or polyethylene foam.

10. The tank (71) as claimed in claim 1, wherein the filling elements (15) are situated above, below or at a corrugation node (20) in the direction of greater slope, the corrugation nodes (20) being formed by an intersection between a corrugation of the first series of corrugations (10) and a corrugation of the second series of corrugations (11).

11. The tank (71) as claimed in claim 1, wherein the filling elements (15) comprise, on an upper face (24) turned towards the corrugation to close, at least one beading (26) extending in the direction y, the at least one beading (26) being configured to be compressed during assembly so as to form a seal.

12. The tank (71) as claimed in claim 1, wherein the sealing membrane (4) is a primary sealing membrane and the thermally insulating barrier (3) is a primary thermally insulating barrier, said juxtaposed insulating panels (5) being primary insulating panels, the tank walls (1, 12, 13) further comprising, successively in a direction of thickness, a secondary thermally insulating barrier including a plurality of juxtaposed secondary insulating panels, the secondary insulating panels being held against the supporting wall of the supporting structure (2), and a secondary sealing membrane supported by the secondary thermal insulating barrier and disposed between the secondary thermal insulating barrier and the primary thermally insulating barrier (3) such that the primary insulating panels (5) are held against the secondary sealing membrane.

13. The tank (71) as claimed in claim 1, wherein the bottom wall (12) comprises a sealing membrane (4) intended to be in contact with the liquefied gas contained in the tank and at least one thermal insulation barrier (3) arranged between the sealing membrane and a supporting wall of a supporting structure, the thermal insulation barrier including a plurality of juxtaposed insulating panels, wherein the sealing membrane of the bottom wall includes corrugated metal plates (9) juxtaposed to each other and comprising a first series of parallel corrugations (10), extending along a first direction and a second series of parallel corrugations (11) extending along a second direction, the corrugations protruding towards the inside of the tank and forming channels (14) for circulating a gas present in the thermally insulating barrier.

14. The tank (71) as claimed in claim 13, wherein the bottom wall (12) comprises filling elements (15) with pressure loss, which are disposed in the corrugations of the first series of corrugations (10) or of the second series of corrugations (11) so as to obstruct the circulation channel of said corrugations, the filling elements (15) being distributed over the entire bottom wall so as to form a staggered grid (19) of filling elements (15) in the circulation channels (14) of the bottom wall (12), and the filling elements (15) being configured to ensure a pressure loss reducing a gaseous flow passing through said circulation channel (14) by at least 80%.

15. The tank (71) as claimed in claim 13, wherein the tank (71) comprises filling elements (15) with pressure loss, which are disposed in the corrugations of the first series of corrugations (10, 28) or of the second series of corrugations (29) in each tank angle formed by the bottom wall (12) and one of the peripheral walls (1) so as to obstruct the circulation channel of said corrugations, the filling elements (15) forming an edge belt (27), the edge belt (27) being formed all round the bottom wall at said angles.

16. The tank (71) as claimed in claim 15, wherein each corrugation of the first series of corrugations (28) and of the second series of corrugations (29) of the bottom wall (12) is aligned with a corrugation of the first series of corrugations (10) of a peripheral wall (1) so as to form continuous circulation channels crossing the angles of the tank, the filling elements (15) of the edge belt (27) being disposed in each of said continuous circulation channels.

17. A vessel (70) for transporting a cold liquid product, the vessel including a double hull (72) and a tank (71) as claimed in claim 1 disposed in the double hull.

18. A system for transferring a cold liquid product, the system including a vessel (70) as claimed in claim 17, insulated pipes (73, 79, 76, 81) arranged so as to connect the tank (71) installed in the hull of the vessel to a floating or land storage installation (77) and a pump for sending a flow of cold liquid product through the insulated pipes from or to the floating or land storage installation to or from the tank of the vessel.

19. A method for loading or unloading a vessel (70) as claimed in claim 17, whereby a cold liquid product is fed through insulated pipes (73, 79, 76, 81) from or to a floating or land storage installation (77) to or from the tank (71) of the vessel.

* * * * *